July 16, 1957 J. M. BAKER 2,799,041
CASTER MOUNTING
Filed July 21, 1954
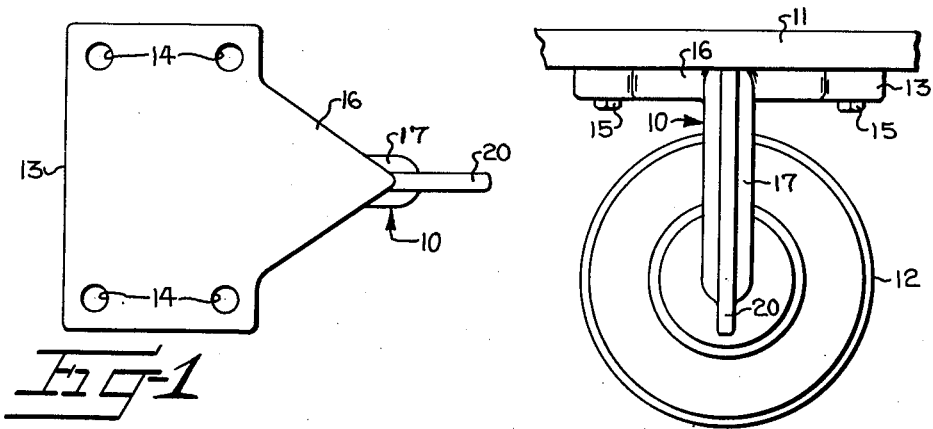
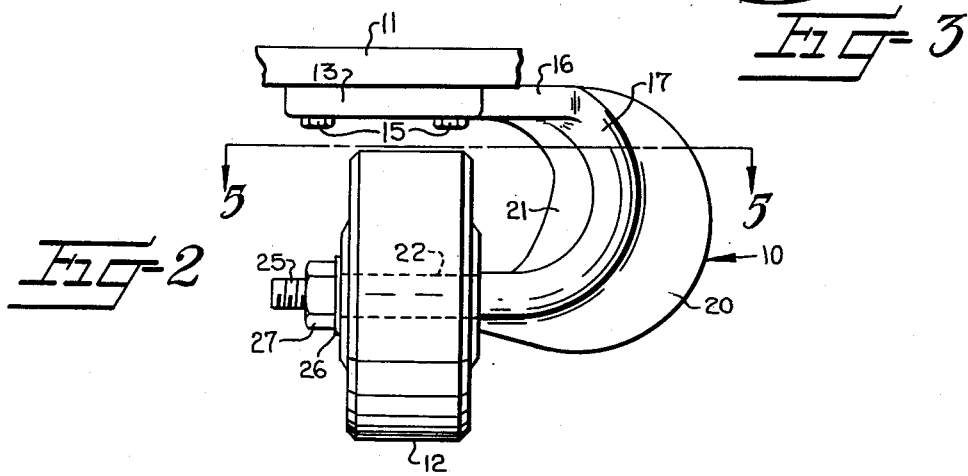
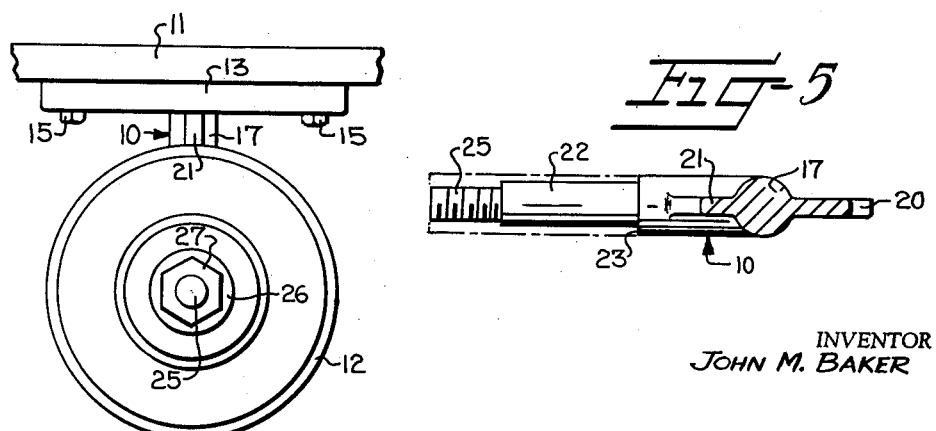
INVENTOR
JOHN M. BAKER
BY Eaton + Bell
ATTORNEYS

2,799,041

CASTER MOUNTING

John M. Baker, Spartanburg, S. C., assignor to The American Pulley Company, Philadelphia, Pa., a corporation of Pennsylvania Application July 21, 1954, Serial No. 444,848

1 Claim. (Cl. 16—40)

This invention relates to casters of the type used for supporting hand trucks, furniture and the like.

It is an object of this invention to provide a caster mounting of one piece construction which can be cast from metal and wherein a minimum of machining is required to form the axle portion thereof to accommodate the roller or caster wheel.

It is another object of this invention to provide an improved caster having a substantially C-shaped frame cast from metal and whose upper portion is flared outwardly to facilitate securing the upper portion to the object to be supported by the caster and whose lower portion is machined to form an axle or spindle thereon on which the roller or caster wheel is mounted, the outer end of the axle being provided with a threaded portion thereon for the reception of a nut or other fastening means for securing the wheel for rotation on the axle or spindle.

Some of the objects of the invention having been stated, other objects will appear as the description proceeds when taken in connection with the accompanying drawing, in which—

Figure 1 is a top plan view of the improved caster mounting;

Figure 2 is a side elevation of the improved caster mounting showing the wheel or roller mounted on the axle portion thereof and looking up at the lower side of Figure 1;

Figure 3 is a view looking at the right-hand side of Figure 2;

Figure 4 is a view looking at the left hand side of Figure 2;

Figure 5 is a sectional plan view taken substantially along line 5—5 in Figure 2, but omitting the wheel or roller and the nut from the axle portion and the threaded portion, respectively.

Referring more specifically to the drawing, the numeral 10 broadly designates the improved caster mounting, the number 11 indicates an object to which the caster mounting 10 may be secured and the numeral 12 indicates a suitable roller or caster wheel which the improved caster mounting is adapted to receive.

Improved caster mounting 10 is preferably made from cast iron or cast aluminum alloy although it may be cast or formed from any other rigid material having sufficient tensile strength, as desired. The caster mounting 10 is in the form of a substantially C-shaped frame whose upper leg or portion is indicated at 13 and is in the form of a substantially rectangularly shaped relatively thin plate which is provided with a plurality of bores or holes 14 therein for the reception of screws or bolts 15 for securing the plate portion 13 of the caster mounting 10 to the lower surface of the object 11 to be supported thereby.

The plate portion 13 of the caster mounting 10 has a rearwardly extending substantially triangularly shaped portion 16 thereon whose upper surface is formed flush with the upper surface of the rectangular portion 13 and the rear portion of the triangular portion 16 is connected or formed integral with the upper end of a substantially semi-circular rib portion 17 which, as best shown in Figure 5, is substantially circular in cross section and which has a crescent-shaped rib portion 20 extending rearwardly therefrom as well as a relatively smaller substantially crescent-shaped front or inner rib portion 21 projecting from the front portion thereof. It will be observed in Figures 1, 3, 4 and 5 that the crescent-shaped ribbed portions are relatively thin as compared to the cross sectional diameter of the semi-circular rib portion 17 or body portion 17, the crescent-shaped rib portions 20 and 21 preferably being approximately one third of the cross sectional diameter of the arcuate or semi-circular body portion 17.

When the improved caster mounting 10 is molded or cast, it is preferably that the lower leg of the body portion 17 extend outwardly slightly beyond the vertical plane of the free front edge of the planar portion 13 as shown in broken lines in Figure 5, thus the lower leg of the body portion 17 may be machined to form an axle portion or journal portion 22 thereon of smaller diameter than the cross-sectional diameter of the remainder of the body portion 17 for reception of the caster wheel or roller 12.

A shoulder 23 is thus formed at the juncture of the axle portion 22 with the curved body portion 17 against which the corresponding end of the caster wheel or roller 12 may have sliding rotational movement. The free end of the axle portion or journal portion 22 has a reduced threaded portion 25 thereon for the reception of a washer 26 and a nut 27 for retaining the wheel 12 on the axle portion or journal portion 22. In order that the caster wheel 12 may rotate freely on the journal portion 22, it is preferable that the washer 26 seats against the shoulder formed at the juncture of the journal portion 22 and the threaded portion 25 so the nut 27 can be tightened against the washer 26 without clamping the caster wheel 12 between the washer 26 and the shoulder 23.

The provision of a caster mounting formed as an integral unit in the manner described provides sufficient space adjacent the wheel 12 to prevent accumulation of threads and other foreign matter which have heretofore accumulated about the wheels on conventional caster mountings heretofore in use. It has been found that caster mountings heretofore used in the textile industry have permitted an accumulation of foreign matter to build up about the wheels so as to freeze the wheels and prevent proper movement thereof. This has resulted from the fact that the fork supporting the wheels was closely spaced adjacent opposite edges of the wheels and the instant invention is constructed in such a manner as to eliminate this condition.

In the event an accumulation of threads does build up about the wheel 12 on the present mounting, it is a simple matter to manually remove the threads without the necessity of removing the wheel. This is in contrast to the past practice wherein it was necessary to completely remove the wheel from the fork in order to remove an accumulation of threads and other foreign matter which had frozen the wheel.

It is thus seen that there is provided a simple and durable caster mounting which may be cast in one piece and wherein it is only necessary to machine or finish the journal portion 22 and the reduced threaded portion 25 thereof for accommodating the wheel or roller 12. There are instances in which it may be desirable to machine or finish the upper surface of the planar portion 13 and the extension 16 thereon although this is normally unnecessary when the casting from which the support or caster mounting is made and carefully molded. In any event, the axle portion or journal portion 22 should be substantially parallel with the upper surfaces of the portions 13 and 16 of the improved caster mounting or support 10.

In the drawings and specification there has been set forth a preferred embodiment of the invention and, although, specific terms are implied, they are used in a generic and descriptive sense only and not for purposes of limitation, the scope of the invention being defined in the claim.

I claim:

A one-piece wheel mounting comprising an upper portion, an extension projecting outwardly from one edge of the upper portion in alinement therewith, a substantially arcuate body portion being circular in cross-section and curving outwardly and downwardly from the extension and then inwardly and terminating inwardly of the upper end of the body portion, inner and outer ribs extending in opposite directions from the arcuate body portion, said ribs being of less thickness than the diameter of the arcuate body portion and the inner rib extending from beneath the extension to a point adjacent the lower inner end of the body portion, a lower portion extending inwardly from the lower end of said body portion in substantially parallel spaced relation beneath the upper portion, said lower portion being shaped to define an axle of less diameter than the body portion to thereby form a shoulder at the juncture of the lower portion with the body portion, a wheel rotatably mounted on said axle, and said shoulder being in vertical alinement with the juncture of the upper portion and the extension whereby the wheel is spaced inwardly from the outermost portion of the body portion a distance at least equal to the length of said extension.

References Cited in the file of this patent

UNITED STATES PATENTS

| | | |
|---|---|---|
| 539,543 | Ransden | May 21, 1895 |
| 2,017,404 | Lorig | Oct. 15, 1935 |
| 2,263,240 | Hise | Nov. 18, 1941 |
| 2,742,663 | Meadows | Apr. 25, 1956 |

FOREIGN PATENTS

| | | |
|---|---|---|
| 449,334 | Great Britain | June 25, 1936 |